Oct. 20, 1931.   G. SPATTA   1,828,156

PROCESS OF MAKING WHEELS

Filed May 28, 1928   5 Sheets-Sheet 1

Witness
William P. Kilroy

Inventor,
George Spatta
By Brown Jackson Boettcher
& Dienner,
Attys

Oct. 20, 1931.  G. SPATTA  1,828,156
PROCESS OF MAKING WHEELS
Filed May 28, 1928  5 Sheets-Sheet 2
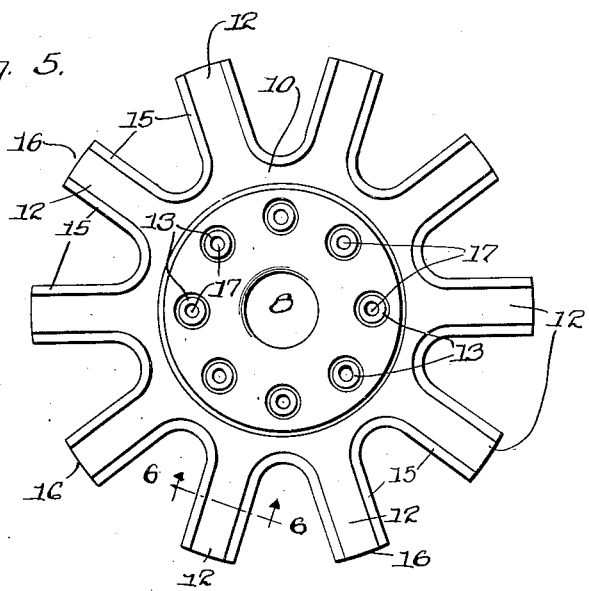
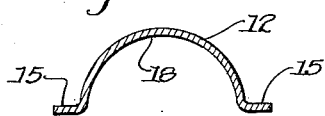
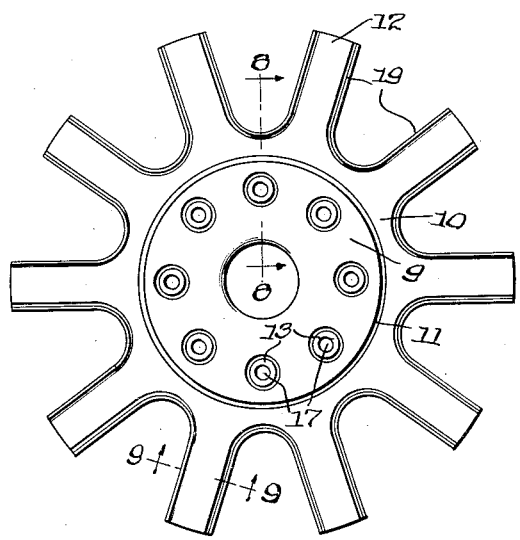
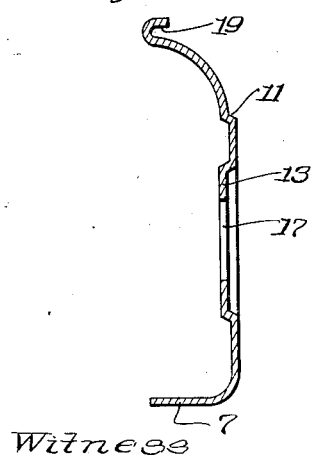

Oct. 20, 1931.  G. SPATTA  1,828,156
PROCESS OF MAKING WHEELS
Filed May 28, 1928   5 Sheets-Sheet 3
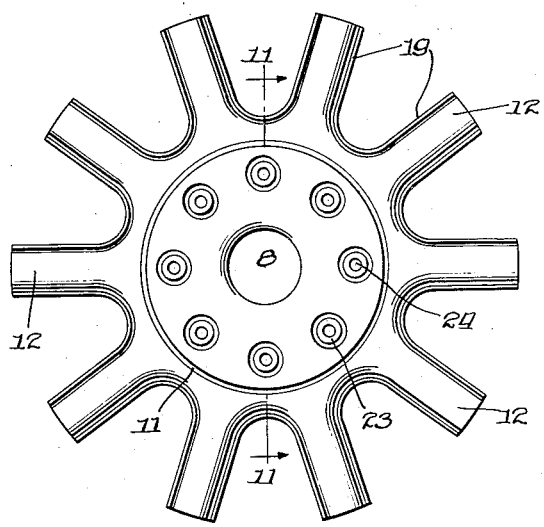
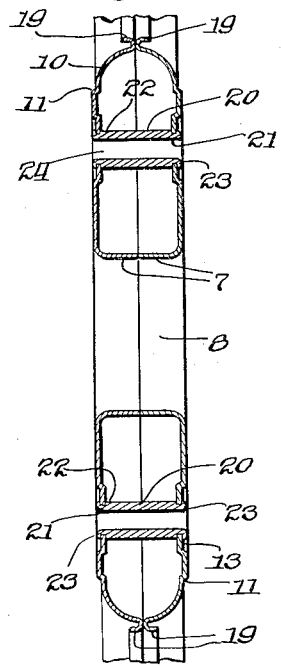
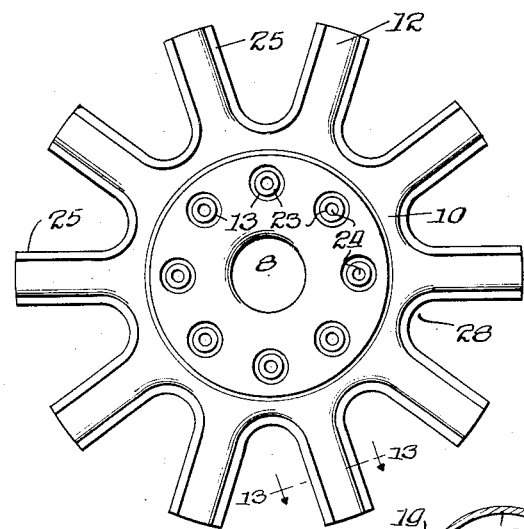
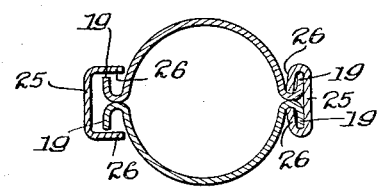
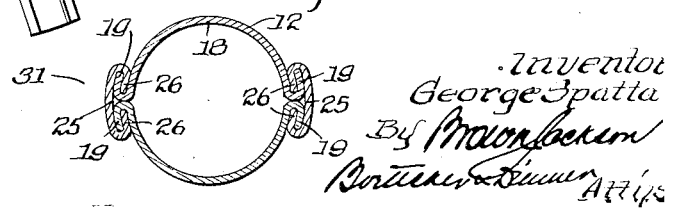

Oct. 20, 1931.   G. SPATTA   1,828,156
PROCESS OF MAKING WHEELS
Filed May 28, 1928   5 Sheets-Sheet 4
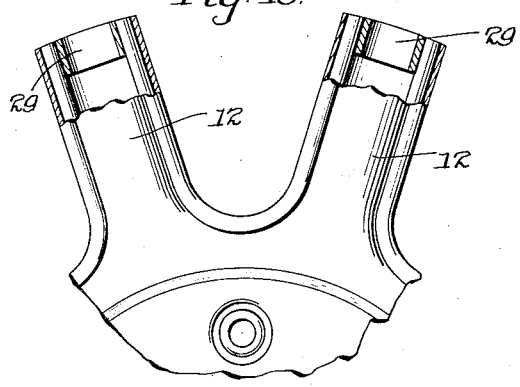
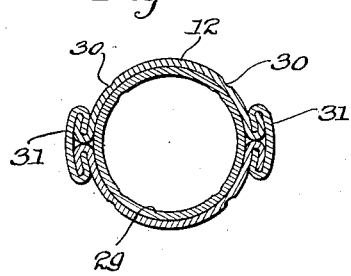
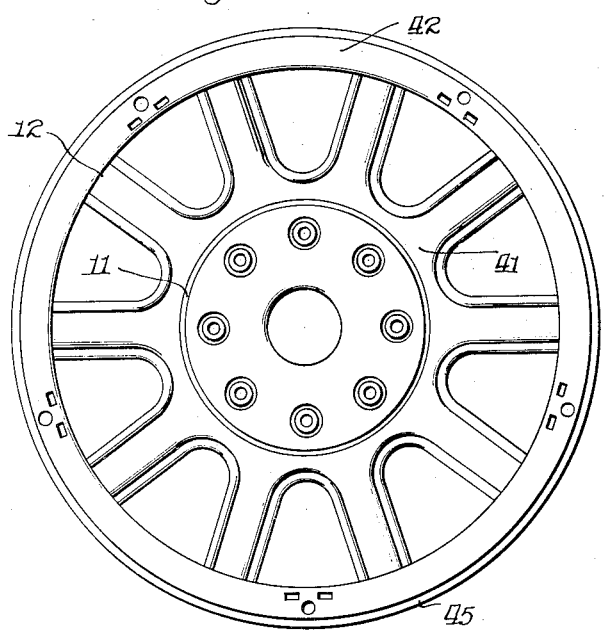
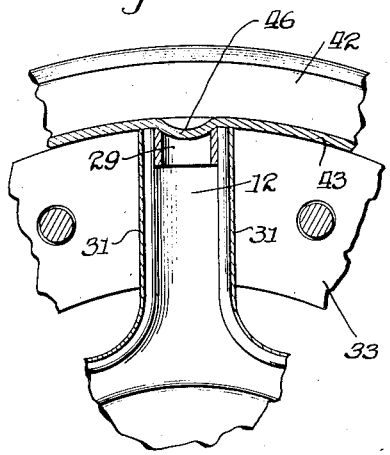
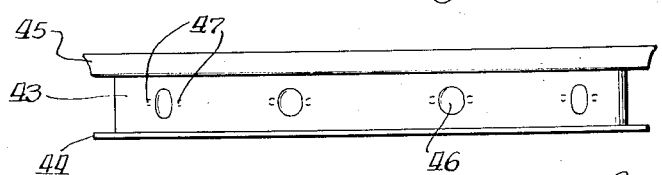
Witness
William P. Kilroy
Inventor,
George Spatta
By Brown Jackson Boettcher & Dienner
Attys Oct. 20, 1931.　　　　G. SPATTA　　　　1,828,156

PROCESS OF MAKING WHEELS

Filed May 28, 1928　　　5 Sheets-Sheet 5

Inventor
George Spatta

Witness

Patented Oct. 20, 1931

1,828,156

UNITED STATES PATENT OFFICE

GEORGE SPATTA, OF BUCHANAN, MICHIGAN, ASSIGNOR TO CLARK EQUIPMENT COMPANY, OF BUCHANAN, MICHIGAN, A CORPORATION OF MICHIGAN

PROCESS OF MAKING WHEELS

Application filed May 28, 1928. Serial No. 280,981.

My present invention relates to the process of manufacturing a sheet metal wheel of the type disclosed in my co-pending application, Serial No. 246,926, filed January 16, 1928.

The wheel comprises a spider formed of two halves constructed each of a sheet of metal, joined together into an integral mechanical structure, and the spider being then forced or otherwise introduced under compression into a channel-shaped rim or felloe and there locked or otherwise secured in place.

In the wheel disclosed in the co-pending application of Mogford and Burger, issued as Patent No. 1,691,163 of November 13, 1928, there is shown a hollow cast metal spider which is forced into a channel-shaped rim or felloe and there locked in place by depressions of the bottom of the channel into the open ends of the spokes. In that wheel, the load is mainly supported on the column strength of the spokes, the rim having great enough bending strength and being under sufficient tension, always, to maintain the two parts in interstressed relation within the capacity of the wheel.

In the present construction, where sheet metal is employed for making up the hollow spider, and this sheet metal is of the order of only fifty-thousandths of an inch in thickness, it is undesirable to depend solely upon the column strength of the spokes, although the column strength of the spokes is very considerable. I prefer, according to the present invention, to make the wheel of a suspended hub type, with the added strength which the spokes can give as columns added to the strength of the upper spokes in tension. In brief, the present wheel is designed and constructed to be stressed throughout by the application of load. The wheel may be employed with fixed bearings, as shown in my aforesaid co-pending application, or it may be constructed as a removable or interchangeable wheel on the front and back axles, if so desired.

I am aware that sheet metal wheels of this general class have heretofore been constructed, as shown for example in British specification No. 219,817, but there are defects in the mode of construction of wheels of the prior art, which it is the aim of the present invention to overcome, as will be more apparent from the following detailed description of the specific embodiment of my invention, in connection with the accompanying drawings, which illustrate the steps employed in manufacturing the wheel and the resultant wheel.

In the accompanying drawings:

Figure 5 is a plan view of a blank, after it has been trimmed;

Figure 6 is a fragmentary cross-section taken on the line 6—6;

Figure 7 is a plan view of the blank, after the edges have been curled;

Figure 8 is a partial section, taken on the line 8—8 of Figure 7;

Figure 9 is a fragmentary cross-section of one of the spoke parts, taken on the line 9—9 of Figure 7;

Figure 10 is a plan view of a spider, comprising the two halves jointed together by the tubular rivets or hollow posts between the spider halves;

Figure 11 is a cross-sectional view of a device shown in Figure 10, taken on the line 11—11;

Figure 12 is a plan view of the spider of Figure 10 with the binding strips applied to the edges of the spokes;

Figure 13 is a fragmentary section, taken on the line 13—13 of Figure 12, showing the binding or locking strips applied to the spokes, before the same are rolled or spun into final engagement;

Figure 14 is a similar section, showing the lock seam completed;

Figure 15 is a fragmentary view, partly in section, showing the application of sleeves in the end of the spokes;

Figure 16 is a sectional view, through the end of a spoke, showing the sleeves spot welded to the side walls of the spoke;

Figure 20 illustrates the step of pressing or punching the web of the rim or felloe into the open end of the spoke;

Figure 21 is an edge view of the wheel, showing the wheel completed, with spot welds formed between the ends of the lock seams and the web of the rim or felloe;

Figure 22 is a side view of the completed wheel ready for mounting of the hub or bearings thereupon.

Figure 1:
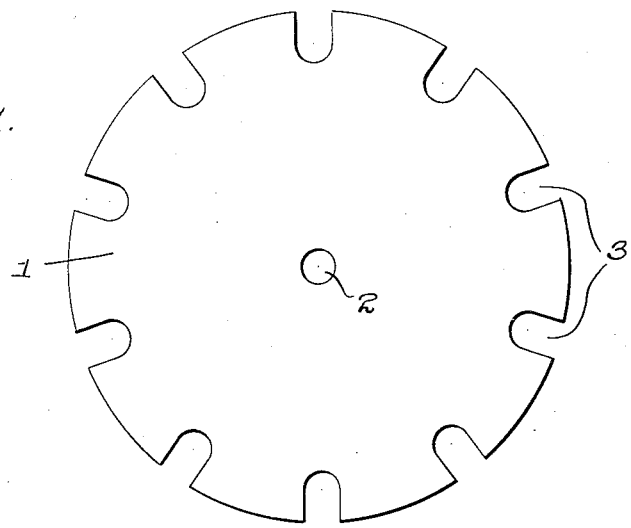
Figure 1 is a plan view of a sheet, blanked out for forming one side of the spider.

In making up my wheel, I first blank out of a sheet of metal, a round blank 1, shown in Figure 1, having a center opening 2 and notches 3 formed about the periphery of the disc 1. These notches later occupy the openings between the spokes, as will be apparent later. The diameter of this blank is made somewhat larger than the desired diameter of the finished spider. The hole 2 is made of a size depending upon the diameter of the hub opening. Where the wheel is to have a fixed hub attached thereto, the diameter of the opening for front and rear wheels is different, but arrangement is made for this difference in diameter by an interchangeable center die which will be described in a co-pending application.

While, in the specific example herein shown, I am illustrating a wheel having ten spokes, this is optional and may be varied, within limits.

Figure 2:
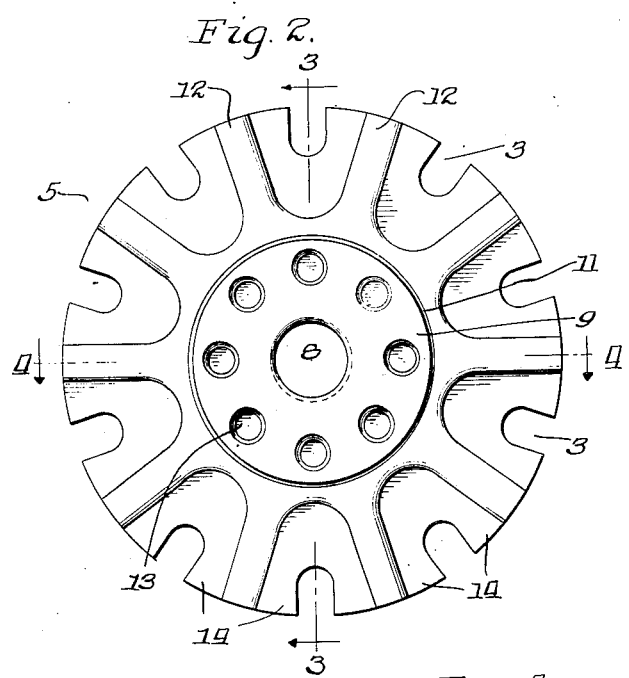
Figure 2 is a plan view of the blank, after it is formed, that is, after the spokes and hub portions are drawn and the seats are formed in the hub portions for the hollow posts or filler between the halves of the spider.
Figure 3:
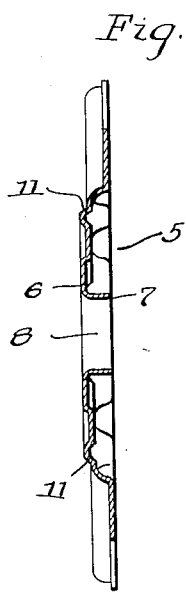
Figure 3 is a vertical cross-section, taken on the line 3—3 of Figure 2.
Figure 4:
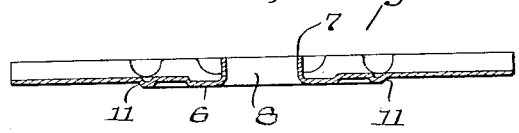
Figure 4 is a section, taken at right angles to the prior section, on the line 4—4 of Figure 2.

After the blanking operation, illustrated in Figure 1, the blank is formed in a suitable die to the form shown in Figures 2, 3 and 4.

At this time, the blank takes the shape 5, comprising a raised hub portion 6 having an inturned flange 7, which forms a part of the tubular wall defining the hub opening 8. This hub portion 6 comprises two parts, namely, a central flat disc portion 9 and a web 10 lying outside of the same and which web merges into the spokes. The flat disc portion 9 is circular and is raised slightly beyond or above the plane of the web portion 10 by an annular shoulder 11. The height of this annular shoulder and, hence, the thickness of the wheel and, likewise, the length of the tubular wall 7, is controlled in the die to provide the thickness of the hub or nave portion for different sizes or dimensions of wheels.

I am aware that it has, heretofore, been proposed to form the spokes 12 progressively from the sheet 1, but there is an inherent advantage in forming the entire nave and spoke formation in one operation, in that the sheet metal suffers less punishment, particularly at the webs or crotches between the spokes. At the same time, better control of the entire sheet is maintained in a single operation and no cumulative error arises, where the forming operation is carried on at one stroke, whereas, if the spokes are progressively formed, a cumulative error tends to creep in and this may be of variable degree, so that successive blanks 5 would not be identical; but my method of procedure, namely, forming and drawing all of the spokes and nave portion simultaneously, secures identical form to a high degree.

The spokes 12, in cross-section, are substantially semi-cylindrical, merging with large fillets into the web portion 10 and having the flanges along their edges extending into the original sheet 1, as will be apparent from Figures 2, 3, and 4.

At the same time that the sheet 1 is formed to provide the spokes, a web portion 10 and the central plate or disc 9, seats 13—13 for the hollow posts or columns between halves of the spider are formed as small circular depressions in the central disc 9. The operation illustrated in Figures 2, 3 and 4, is a forming operation only, with the exception of a wall 7 of the central opening 8, in which there is both a drawing and shearing, in order to bring the inner edge of the wall 7 into the same plane as the inner edges of the web 14, which is the remainder of the original sheet 1.

This forming and shearing is accomplished by drawing the edges of the opening 8 downwardly and outwardly radially by a punch or sliding plunger which draws the metal in the die down to a shoulder where the excess metal is sheared off and the tubular portion 7 expanded into cylindrical form. This may be accomplished in any desired manner, although I prefer to accomplish the same in the manner shown in my pending application, Serial No. 332,763, filed January 16, 1929.

The next operation is a trimming and shearing operation, removing the excess metal from the webs 14 and leaving only the flanges 15 above the edges of the spokes 12 and the web 10 where the spokes merge into the nave.

At the same time, the ends 16 of the spokes 12 are carefully trimmed in the trimming die. also holes 17, at the same time, are punched in the seats 13 for the posts or columns between spider halves. In Figure 6, a cross-section of one of the spokes 12 is shown. The curved portion 18 joins the flanges 15 and the curvature of the portion 18 is that of a radius having its center upon a line joining the bottom surfaces of the flanges 15—15. That is to say, if two of these spoke portions were laid into register with the flanges 15—15 in contact, the curved portions 18 would define a substantially true cylinder. It is not essential that this exact shape or that these dimensions be strictly maintained. Any suitable contour of a curvature of the wall of the spoke that is desired may be employed.

The next operation produces the curled edges, as shown in Figures 7, 8 and 9. For this operation, an edge curling die is employed, which edge curling die has a convex portion accurately filling the concavity of the spider half and providing curling recesses in register with the flanges 15. The opposite half of the die provides a narrow projecting die member, registering with the recess and with the flanges 15 between the die parts, so that on closing the die, the flanges 15 of the entire spider half are curled outwardly away from the surface of the original sheet, as shown in Figures 7, 8 and 9. The flanges 15 are thus transformed into curled flanges 19, both along the sides of the spokes and along the edges of the web portion, into which the spokes merge.

The next operation in making the wheel is to join together two spider halves in register. Hollow posts or columns 20—20, having reduced necks 21 and shoulders 22, are inserted through the openings 17 in the seats 13 and are riveted over, as indicated at 23, the riveted-over metal 23 lying within the confines of the recesses 13, in order to avoid disturbing the plane surfaces of the central disc portion 9. The inner edges of the tubular portion 7—7 are brought to register to define a complete transverse opening 8 through the nave of the wheel, the curled flanges 19—19 are brought accurately into registration and so secured by the hollow posts or columns 20, the two parts of the spider being accurately held in alignment during the time that the riveting occurs. The spider thereby takes on a somewhat finished appearance, as indicated in Figures 10 and 11. The holes 24, through the posts or columns 20, are adapted to receive bolts for assembling the hub portions for supporting the wheel, or to clamp the wheel onto a suitable hub member, as may be desired.

The next operation is the lodgment and engagement of channel strips upon the curled flanges 19. These strips are first applied loosely to the curled flanges 19—19, as indicated on the left of Figure 13, suitable V or U-shaped channel strips 25 being applied to the curled flanges 19 and thereafter having their margins or flanges 26—26 bent inwardly, as indicated at the right of Figure 13, by a suitable guide mechanism, either by two operations or, preferably, at one operation, the flanges 26—26 being bent in back of the curled flanges 19—19 into such position that the lock seam may thereafter be closed into the form shown in Figure 14.

The locking of the seam is accomplished by first applying pressure, as by a roller, to the rounded bottom part 28 of the strip 25 to lock the seam at the crotch where the spokes merge into the web 10. Thereafter, pressure is applied to the strip along the sides of the spoke, preferably upon opposite sides of the same spoke, while a mandril of suitable configuration fills the bore of the spoke. The spokes are thus treated in succession to close the lock seams between the spider halves.

The next operation is the insertion of short tubular sleeves or rings 29—29 in the ends of the spokes 12. These rings are preferably seamless rings or sections of a seamless tube, provided for the dual purpose of giving the end of the spoke the desired hoop strength and of increasing the bearing surface of the relatively thin sheet metal spokes. These members 29 may be formed as thimbles, that is, cylindrical portions drawn from sheet metal with a closed end and the closed end being inserted in placing the members 29 in the open ends of the spokes. The ring is spot welded to the walls of the spoke 12 at four points, preferably as indicated at 30—30 in Figure 16. These spot welds are, preferably, at opposite points, adjacent the lock seams 31, as shown in Figure 16. Since the ends of the sleeve or ring 29 and the end of the spoke 12 are both open, the electrode for making the spot weld may be inserted in the ring 29. It is to be observed, that the outer end of the spoke is intended to fit closely the cylindrical inner periphery of the rim or felloe 42, later to be described.

The ring or thimble 29 is, preferably, provided with its outer end lying in a plane at right angles to its longitudinal axis. In other words, it will not conform exactly to the cylindrical surface of the web of the rim or felloe. This is not essential, since, in a subsequent operation, as described in Figure 20, depressions of the metal of the web of the rim pressed into the open ends of the spokes will secure a bearing between a rim and the end face of the ring 29. Obviously, if desired, the ends of the spokes and the rings 29 therein may be trimmed off to a true cylindrical shape, but I find that this is not necessary.

Figure 17:
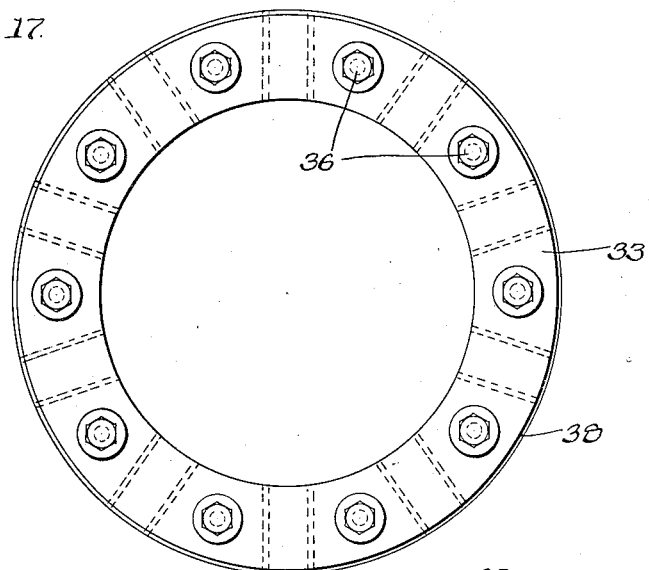
Figure 17 is a plan view of the spider, mounted in the clamping device for forcing the spider into the wheel rim.
Figure 18:
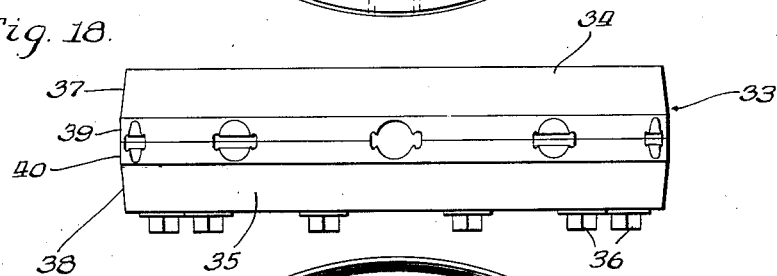
Figure 18 is an edge view of the same.

The spider is next mounted in a clamping ring, as shown in Figure 17. The clamping ring 33 is a split clamp made up of similar halves 34 and 35, having radial holes or slots fitting closely the ends of the spokes. The two halves of the ring are held together by the clamping screws 36, so as to hold the spider securely. The clamping members 34 and 35 are chamfered off or relieved to provide conical shoulders, as indicated at 37 and 38, and have cylindrical parts 39 and 40 of a width slightly greater than the diameter of the spokes, so as to support firmly each of the spokes, for closing the clamp, particularly around the outer edges of the spokes. The spider may be carefully trimmed to size, as desired, after the rings 29 are inserted in place, where it is desired to have the rings bear fully upon an inside peripheral surface of a rim or felloe. This may be done either before clamping or after clamping the spider in the clamping ring 33.

The spider halves were trimmed to size in the trimming and piercing die, to produce the blank shown in Figure 5, but the forming and closing of the seams and the insertion of the rings 29 makes it advisable, in the preferred practice of the invention, to trim the spider just before it is forced into the rim. The clamping ring 33, with the spider 41 securely clamped in place, is then pressed into the rim or felloe 42, this felloe being a rolled metal ring which comprises an endless ring of outwardly facing channel section of known form for mounting a demountable rim bearing tire. Obviously, the rim may bear the tire directly, particularly where a drop center rim is employed, a dropped central part, in that event, embracing the spider by bearing upon the ends of the spokes 12. The rim 42 comprises a web 43 which forms the bottom of the channel and a short flange 44, and a longer flange 45, as is well known in the art.

In assembling the spider and rim, I preferably force the spider mounted in the clamping ring 33, by a hydraulic pressure, into the rim, the ends of the spokes lying substantially flush, or projecting a few thousandths of an inch with respect to the cylindrical surface 39—40 of the clamping ring 33. If desired, the rim 42 may be shrunk upon the spider as, for example, by heating the same with a heavy flow of current through the rim, to cause it to expand and subsequently cooling it to cause the rim to contract upon the spider. The spider is forced in, under pressure, thereby putting a degree of tension upon the rim 42, to insure a close fit between the parts.

The wheel may be constructed on either the theory of supporting the load of the axle on the spokes in compression or on the theory of supporting the load of the axle on the spokes, partly in tension and partly in compression. If the spokes are to be subjected to compression only, the tension in the rim is made relatively great by the insertion of the spider and the two parts are then locked together by the subsequent operation of depressing the web 43 of the rim 42 into the open ends of the spokes, which operation further contracts the web of the rim onto the spider or, if tension is mainly to be relied upon, the interstressing by insertion of the spider into the rim is relatively low being only great enough to secure a good tight fit and then, in addition to the cupping of the web of the rim into the open ends of the spokes, welding of the ends of the spokes to the web of the rim is performed to fasten the spokes to the rim in such a manner that they can sustain tension.

Figure 19:
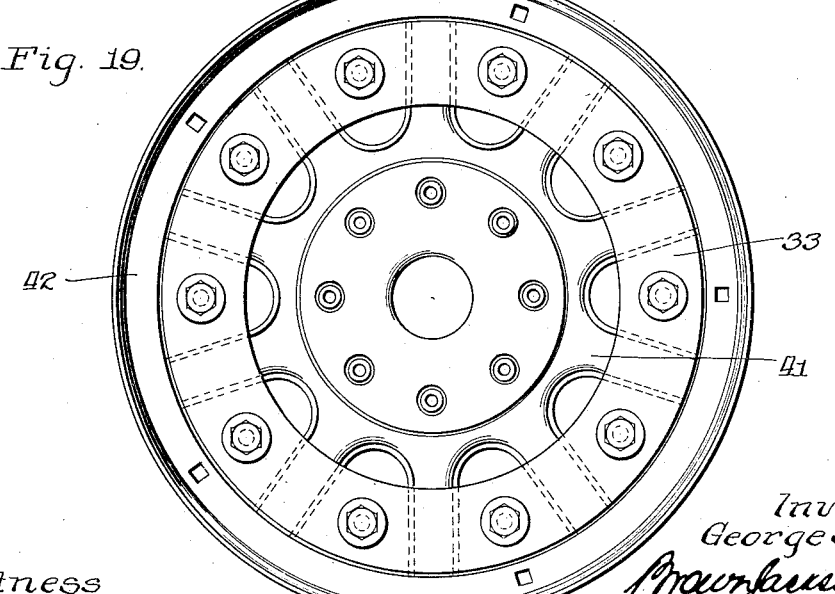
Figure 19 is a plan view of the spider, pressed into the rim or felloe with the clamping device still in place.

Assuming that the wheel is to support the load mainly by the column strength in compression of the spokes, the next operation is cupping. With the ring 33 still clamped upon the spokes and, as shown in Figures 19 and 20, the ring is suitably supported in a press at the particular spoke where the pressing operation is to be performed and, by means of a punching or drawing tool, the web 43 is depressed, as indicated at 46 in Figure 20, into the open end of the spoke 12. The sleeve or ring 29, which is welded to the walls of the spoke 12, imparts sufficient hoop strength to the end of the spoke to prevent bursting circumferentially of the end of the spoke, even under a heavy load.

In addition, the ring or sleeve provides added area of contact between the spoke and the web of the rim for sustaining the thrusts of the load put upon the spoke. Another important advantage of the ring is the strength which it imparts to the end of the spoke, during the forcing of the spider laterally into the rim. Much greater degree of interstress between the rim and the spoke is permissible where the ring 29 is employed because it prevents the crumpling of the edges by the lateral pressing operation when the spider is forced into the rim.

In order to secure the advantage of using the spokes in tension to sustain the load, spot welds are then formed between the end of the spoke and a web of the rim outside of the cupped depression 46. For example, as shown in Figure 21, I form spot welds 47 endwise in line with the lock seams 31. Such spot welds perform a dual function of uniting the spoke and rim and also tend to unite by welding the component parts of the lock seam at the end of the spoke.

For lighter types of wheels, the ring 29 and the truing operation previously described may be omitted, particularly where the spot welding is employed, as indicated at 47 in Figure 21 for uniting the ends of the lock seams with the web of the rim or felloe 42. The depressions 46 are formed without difficulty, in view of the support which the clamping ring 33 provides, whether the ring 29 is employed or not. The depressions 46 are, preferably, shallow and do not interfere with the placing of a tire directly upon the rim, where a drop center rim is employed.

I do not intend to be limited to the details shown and described, except as they appear in the appended claims, nor do I intend to be limited to the specific order in which the steps have been described, nor the specific manner of performing the same except as recited in the appended claims.

I claim:

1. The method of making a wheel of the class described, which comprises blanking out a circular disc of sheet metal, simultaneously forming notches in the periphery of the disc and perforating the center, then forming spoke and hub portions with the spokes lying between the notches, drawing and trimming a central flange about the central opening, raising a disc above the spoke portions, depressing seats in the disc portion, then trimming away parts of the original sheet between the spokes to leave narrow flanges lying in the plane of the original sheet, punching openings in the seats in the raised disc portion, then curling the aforesaid flanges along the sides of the spokes and along the connecting web between spokes, inserting shouldered hollow rivets between a pair of blanks constructed as aforesaid, aligning said blanks and riveting over the ends of the hollow posts or rivets to secure the said two blanks in alignment, applying channel-shaped locking strips to the curled edges, closing the locking strips with the curled edges to form locked seams, inserting sleeves in the open ends of the spokes and securing the sleeves to the metal of the ends of the spokes, supporting the ends of the spokes in a split circular clamp, forming a circular felloe of outwardly facing channel section, and forcing the spider, while mounted in the clamp, into the felloe to tension the felloe upon the spider.

2. The method of making a wheel of the class described, which comprises blanking out a circular disc of sheet metal, simultaneously forming notches in the periphery of the disc and perforating the center, then forming spoke and hub portions with the spokes lying between the notches, drawing and trimming a central flange about the central opening, raising a disc above the spoke portions, depressing seats in the disc portion, then trimming away parts of the original sheet between the spokes to leave narrow flanges lying in the plane of the original sheet, punching openings in the seats in the raised disc portion, then curling the aforesaid flanges along the sides of the spokes and along the connecting web between spokes, inserting shouldered hollow rivets between a pair of blanks constructed as aforesaid, aligning said blanks and riveting over the ends of the hollow posts or rivets to secure the said two blanks in alignment, applying channel-shaped locking strips to the curled edges, closing the locking strips with the curled edges to form locked seams, inserting sleeves in the open ends of the spokes and securing the sleeves to the metal of the ends of the spokes, supporting the ends of the spokes in a split circular clamp, forming a circular felloe of outwardly facing channel section and forcing the spider, while mounted in the clamp, into the felloe to tension the felloe upon the spider, and depressing portions of the web of the felloe into the open ends of the spokes to lock the spider and rim together.

3. The process of making a spider of the class described, which comprises blanking a circular disc out of sheet metal, drawing semi-cylindrical spoke portions, a central hub portion and webs joining the spokes and hub portion, the hub portion being drawn beyond the plane of the spokes and web portion, depressing seats for hollow rivets in the hub portion, drawing a central tubular flange in a hub portion, trimming the blank to leave narrow flanges along the sides of the spoke portions and the web portions joining the spoke portions, piercing the seats for hollow rivets, connecting two blanks back to back with hollow shouldered rivets extending through the openings in the seats, riveting over the hollow rivets within the seats and forming the flanges along the sides of the spokes and the webs between them into lock seams, inserting cylindrical bands in the ends of the spokes, and welding said bands to the walls of the spokes.

4. The method of forming a sheet metal spider of the class described, which comprises blanking a disc of sheet metal, drawing spokes and a raised hub portion out of the plane of the sheet, drawing a tubular central flange in the center of the hub, trimming the blank to leave flanges in the original plane of the sheet extending out from the sides of the spokes and the crotches between them, curling said flanges, assembling two such blanks with curled edges back to back, applying channel strips to form lock seams, inserting circular metal bands in the open ends of the spokes, and welding said bands to the walls of the spokes.

5. The method of making a wheel of the class described, which comprises forming a hollow sheet metal spider of two complementary halves joined together by lock seams along the sides of the spokes and the crotches between them, inserting circular metal bands in the open ends of the spokes, welding the bands to the side walls of the spokes, forming an endless metal rim, supporting the ends of the spokes on opposite sides by clamping rings, and forcing the spider, with the clamping rings thereupon, into the rim to tension the rim upon the spider.

6. The method of making a wheel of the class described, which comprises forming a hollow sheet metal spider of two complementary halves joined together by lock seams along the sides of the spokes and the crotches between them, inserting circular metal bands in the open ends of the spokes, welding the bands to the side walls of the spokes, forming an endless metal rim, supporting the ends of the spokes on opposite sides by clamping rings, forcing the spider, with the clamping rings thereupon, into the rim to tension the rim upon the spider, and depressing the metal of the rim into the open ends of the spokes.

7. The method of making a wheel of the class described, which comprises forming a hollow sheet metal spider of two complementary halves joined together by lock seams along the sides of the spokes and the crotches between them, inserting circular metal bands in the open ends of the spokes, welding the bands to the side walls of the spokes, forming an endless metal rim, supporting the ends of the spokes on opposite sides by clamping rings, and forcing the spider, with the clamping rings thereupon, into the rim to tension the rim upon the spider, depressing the metal of the rim into the open ends of the spokes, and welding the rim to the ends of the lock seams on the spokes.

8. The method of constructing a wheel, which comprises forming an endless circular rim of outwardly facing channel section, forming sheet metal stampings with spoke, web, and hub portions, joining the edges of the spoke and web portions of said stampings, welding circular bands inside the ends of the spokes, clamping the spokes between opposite clamping members, forcing the spider by pressure applied to the clamp into the rim to tension the rim upon the spider, supporting the clamps, and pressing the web of the rim into the open end of the spoke, to cause engagement between the metal of the web and the edge of the band.

9. The method of making a wheel, which comprises forming a hollow sheet metal spider having radial sheet metal spokes, welding reenforcing rings on the inner ends of the spokes with an outer edge of said ring disposed radially inward from the outward edge of the corresponding spoke, clamping the ends of the spokes between two rigid clamping rings, forcing the clamping rings and the spider carried thereby into a circular rim member to tension the rim upon the spider, depressing the metal of the rim member into the open ends of the spokes and simultaneously bringing the same into engagement with the outer edges of the reenforcing rings.

In witness whereof, I hereunto subscribe my name, this 23rd day of May, 1928.

GEORGE SPATTA.